(12) United States Patent
Hall et al.

(10) Patent No.: US 7,286,128 B2
(45) Date of Patent: Oct. 23, 2007

(54) SYSTEM AND METHOD FOR RENDERING DATA ASSOCIATED WITH A 3-D SCENE DESCRIPTION

(75) Inventors: Deirdre M. Hall, Beverly, MA (US); Joshua Napoli, Arlington, MA (US); Won-Suk Chun, Cambridge, MA (US)

(73) Assignee: Actuality Systems, Inc., Bedford, MA (US)

( * ) Notice: Subject to any disclaimer, the term of this patent is extended or adjusted under 35 U.S.C. 154(b) by 139 days.

(21) Appl. No.: 11/177,385

(22) Filed: Jul. 8, 2005

(65) Prior Publication Data

US 2006/0007230 A1  Jan. 12, 2006

Related U.S. Application Data

(60) Provisional application No. 60/629,734, filed on Nov. 19, 2004, provisional application No. 60/627,607, filed on Nov. 12, 2004, provisional application No. 60/586,327, filed on Jul. 8, 2004.

(51) Int. Cl.
    *G06T 15/00* (2006.01)

(52) U.S. Cl. ............................ 345/424; 345/423

(58) Field of Classification Search ............... 345/423, 345/424; 382/279
    See application file for complete search history.

(56) References Cited

U.S. PATENT DOCUMENTS

| | | | |
|---|---|---|---|
| 725,567 A | 4/1903 | Ives | |
| 2,967,905 A | 1/1961 | Hirsch | |
| 3,140,415 A | 7/1964 | Ketchpel | |
| 3,178,720 A | 4/1965 | Collender | |
| 4,523,226 A | 6/1985 | Lipton | 358/88 |
| 4,829,365 A | 5/1989 | Eichenlaub | 358/3 |
| 4,847,807 A | 7/1989 | Yule | 364/900 |
| 4,983,031 A | 1/1991 | Solomon | 353/10 |
| 4,985,856 A | 1/1991 | Kaufman et al. | 364/522 |
| 5,172,251 A | 12/1992 | Benton | 359/9 |
| 5,172,266 A | 12/1992 | Garcia | 359/478 |
| 5,544,283 A | 8/1996 | Kaufman et al. | 395/124 |
| 5,680,525 A | 10/1997 | Sakai et al. | 395/130 |
| 5,751,927 A | 5/1998 | Wason | 395/119 |

(Continued)

FOREIGN PATENT DOCUMENTS

WO  WO9963512 A1  12/1999

OTHER PUBLICATIONS

Goldwasser, A Generalized Object Display Processor Architecture, 1984, IEEE, pp. 38-47.*

(Continued)

*Primary Examiner*—Almis R. Jankus
(74) *Attorney, Agent, or Firm*—Cantor Colburn LLP (57) ABSTRACT

A system and a method for rendering data associated with a 3-D scene description are provided. The system includes a graphics processing unit configured to operably communicate with a communications bus. The graphics processing unit is further configured to receive the 3-D scene description from the communications bus and to generate a 3-D image data set comprising at least a first 2-D data field based on the 3-D scene description. The graphics processing unit is further configured to transmit the 3-D image data set through the communication bus.

11 Claims, 9 Drawing Sheets

U.S. PATENT DOCUMENTS

| | | |
|---|---|---|
| 6,100,862 A | 8/2000 | Sullivan ........................ 345/88 |
| 6,554,430 B2 | 4/2003 | Dorval et al. ................... 353/7 |
| 6,735,346 B2 | 5/2004 | Woodford et al. ........... 382/279 |
| 6,753,990 B1 | 6/2004 | Payne et al. ................... 359/22 |
| 6,850,210 B1 | 2/2005 | Lipton ............................ 345/6 |
| 6,888,545 B2 | 5/2005 | Napoli ........................ 345/424 |
| 2004/0125103 A1 | 7/2004 | Kaufman et al. ............ 345/419 |

OTHER PUBLICATIONS

PCT Search Report, International Application No. PCT/US2005/024199.

G.E. Favalora, R.K. Dorval, D.M. Hall, M.G. Glovinco, J. Napoli, "Volumetric three-dimensional display system with rasterization hardware," in Stereoscopic Displays and Virtual Reality Systems VIII, Andrew J. Woods, Mark T. Bolas, John O. Merritt, Stephen A. Benton, Editors, Proceedings of SPIE vol. 4297, pp. 227-235 (2001).

* cited by examiner

SYSTEM AND METHOD FOR RENDERING DATA ASSOCIATED WITH A 3-D SCENE DESCRIPTION

CROSS REFERENCE TO RELATED APPLICATIONS

The application claims the benefit of U.S. Provisional application Ser. No. 60/586,327, filed Jul. 8, 2004, and U.S. Provisional application Ser. No. 60/629,734, filed Nov. 19, 2004, the contents of which are incorporated herein by reference thereto. The application further claims the benefit of U.S. Provisional application Ser. No. 60/627,607, filed Nov. 12, 2004.

BACKGROUND OF THE INVENTION

Systems have been developed for projecting three-dimensional (3-D) imagery. For example, U.S. Pat. No. 6,554,430 describes a volumetric 3-D display system. These systems, however, have cost-prohibitive computational machinery to generate the data for 3-D image projection, or are restricted to low graphics performance if the cost-prohibitive computational machinery is not utilized.

Accordingly, the inventors herein have recognized a need for an improved system and method for rendering data associated with 3-D images that utilizes cost effective devices such as a graphics processing unit.

BRIEF DESCRIPTION OF THE INVENTION

A system for rendering data associated with a 3-D scene description in accordance with an exemplary embodiment is provided. The system includes a graphics processing unit configured to operably communicate with a communications bus. The graphics processing unit is further configured to receive the 3-D scene description from the communications bus and to generate a 3-D image data set comprising at least a first 2-D data field based on the 3-D scene description. The graphics processing unit is further configured to transmit the 3-D image data set through the communication bus.

A method for rendering data associated with a 3-D scene description utilizing a graphics processing unit and a voxel data manager in accordance with another exemplary embodiment is provided. The graphics processing unit operably communicates with the voxel data manager. The voxel data manager has a voxel router and first, second, and third memory controllers. The method includes receiving the 3-D scene description from a communications bus at the graphics processing unit. The method further includes generating a 3-D image data set comprising at least a first 2-D data field based on the 3-D scene description, utilizing the graphics processing unit. The method further includes transmitting the 3-D image data set from the graphics processing unit through the communication bus.

A system for sorting data associated with a 3-D scene description in accordance with another exemplary embodiment is provided. The system includes a voxel data manager having a voxel router and at least a first memory controller operably communicating with the voxel router. The voxel router is configured to receive a 3-D image data set. The 3-D image data set comprises at least a first 2-D data field. The first 2-D data field comprises at least one 2-D tile. The first memory controller is further configured to transfer the 3-D image data set to at least a first physical destination in the memory.

A method for sorting data associated with a 3-D scene description utilizing a voxel data manager in accordance with another exemplary embodiment is provided. The voxel data manager has a voxel router and at least a first memory controller operably communicating with the voxel router. The method includes receiving a 3-D image data set having at least a first 2-D data field at the voxel router. The 2-D data field has at least one 2-D tile. The method further includes transferring the 3-D image data set to at least a first physical destination in the memory, utilizing the first memory controller.

DETAILED DESCRIPTION OF THE INVENTION

Figure 1:
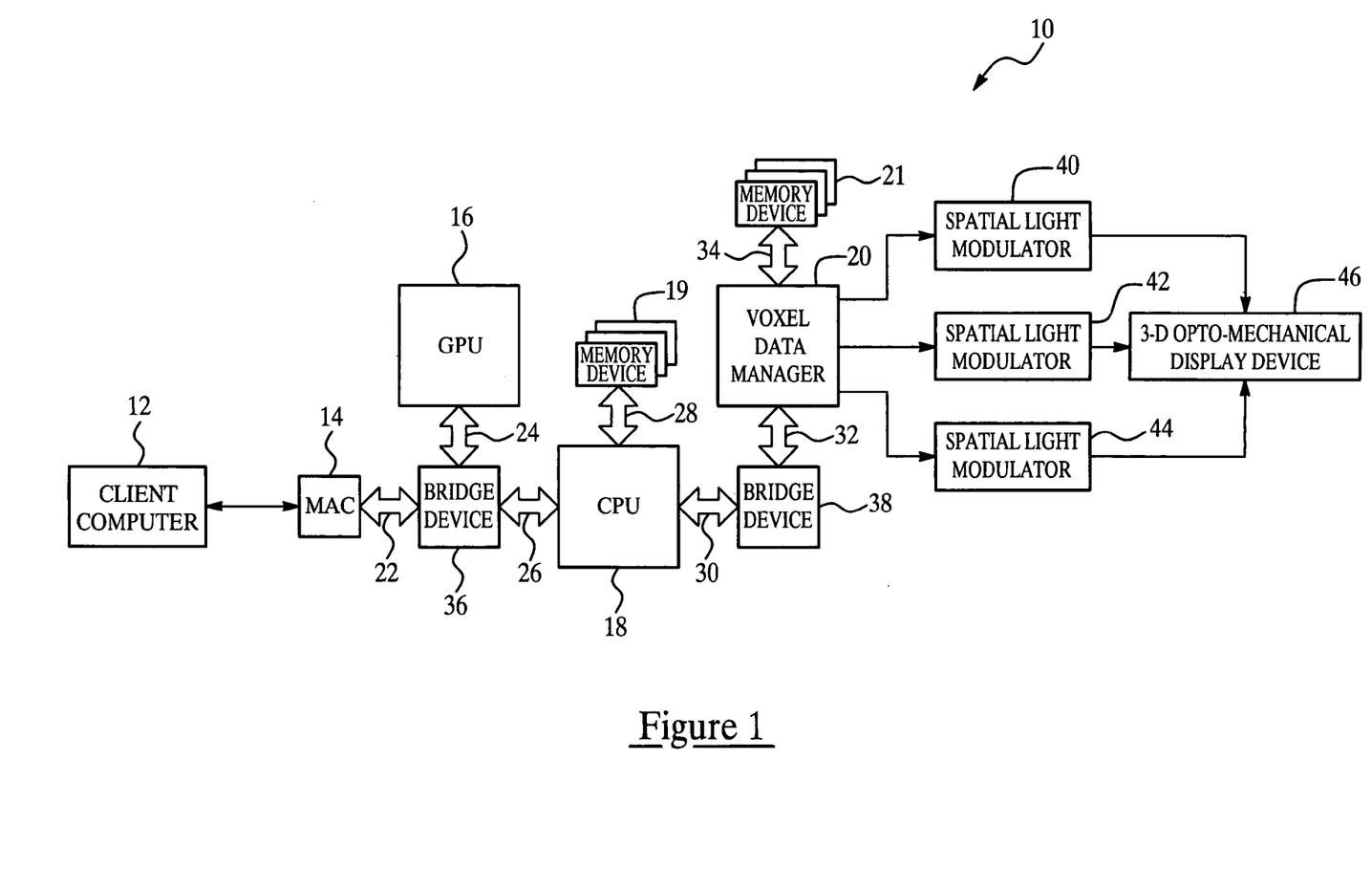
FIG. 1 is a block diagram of a system for rendering data associated with a 3-D image including a graphics processing unit and a voxel data manager in accordance with an exemplary embodiment.

Referring to FIG. 1, a system 10 for rendering data associated with one or more 3-D images is illustrated. The system 10 includes a client computer 12, a media access controller 14, a graphics processing unit 16, a CPU 18, a voxel data manager 20, a memory device 21, communication busses 22, 24, 26, 28, 30, 32, 34, bridge devices 36, 38, spatial light modulators 40, 42, 44, and a 3-D optomechanical display device 46.

The client computer 12 is provided to execute software algorithms for generating a 3-D scene description or 3-D image data associated with one or more 3-D images. The 3-D scene description comprises 3-D geometrical data or 3-D volumetric data. The client computer 12 is configured to transfer the 3-D image data to the media access controller 14. The media access controller 14 is configured to transfer the 3-D image data to the bridge device 36. The bridge device is configured to transfer the 3-D image data through the communication bus 24 to the graphics processing unit (GPU) 16.

Figure 5:
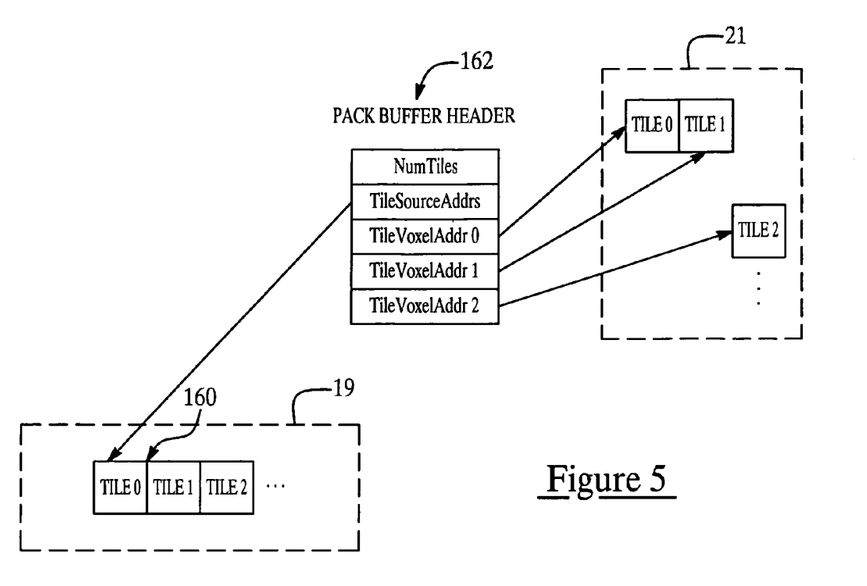
FIG. 5 is a block diagram of a pack buffer header generated by a CPU utilized in the system of FIG. 1.
Figure 7:
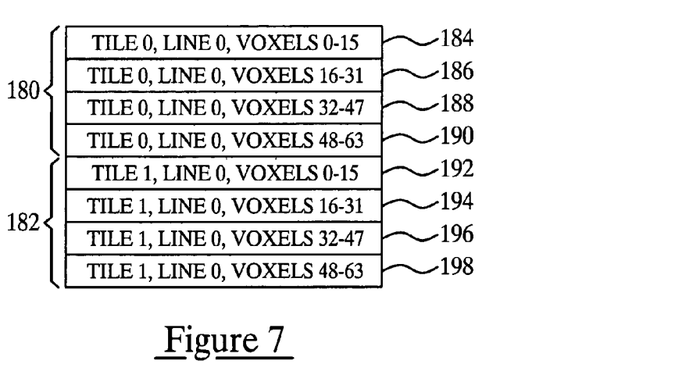
FIG. 7 is a block diagram of 2-D tile fragments generated by the tile controller utilized in the voxel router of FIG. 4.
Figure 9:
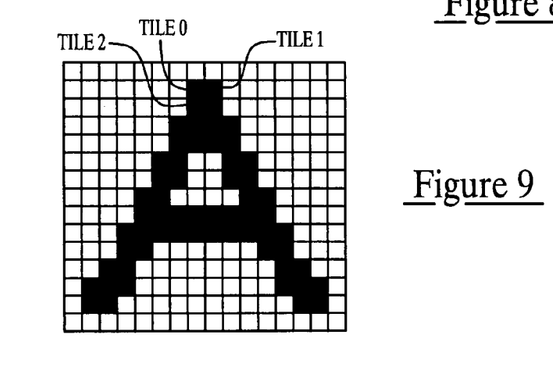
FIG. 9 is a schematic of a 2-D data field comprising a plurality of tiles.

The GPU 16 is provided to generate a plurality of 2-D data fields based on the 3-D image data. Referring to FIGS.

5, 7 and 9, each 2-D data field can be comprised of a plurality of 2-D tiles. For example, the 2-D data field 160 comprises 2-D tiles: Tile0, Tile1, Tile2. Further, each 2-D tile comprises a plurality of 2-D tile fragments. For example, the Tile0 includes: (i) the 2-D tile fragment 180 corresponding to a line of voxels of the Tile0, and (ii) the 2-D tile fragment 182 corresponding to a line of voxels of the Tile1. Further, each 2-D tile fragment comprises a plurality of data words having voxel color data. For example, the 2-D tile fragment 180 includes the data words 184, 186, 188, 190, and the 2-D tile fragment 182 includes the data words 192, 194, 196, 198.

Figure 2:
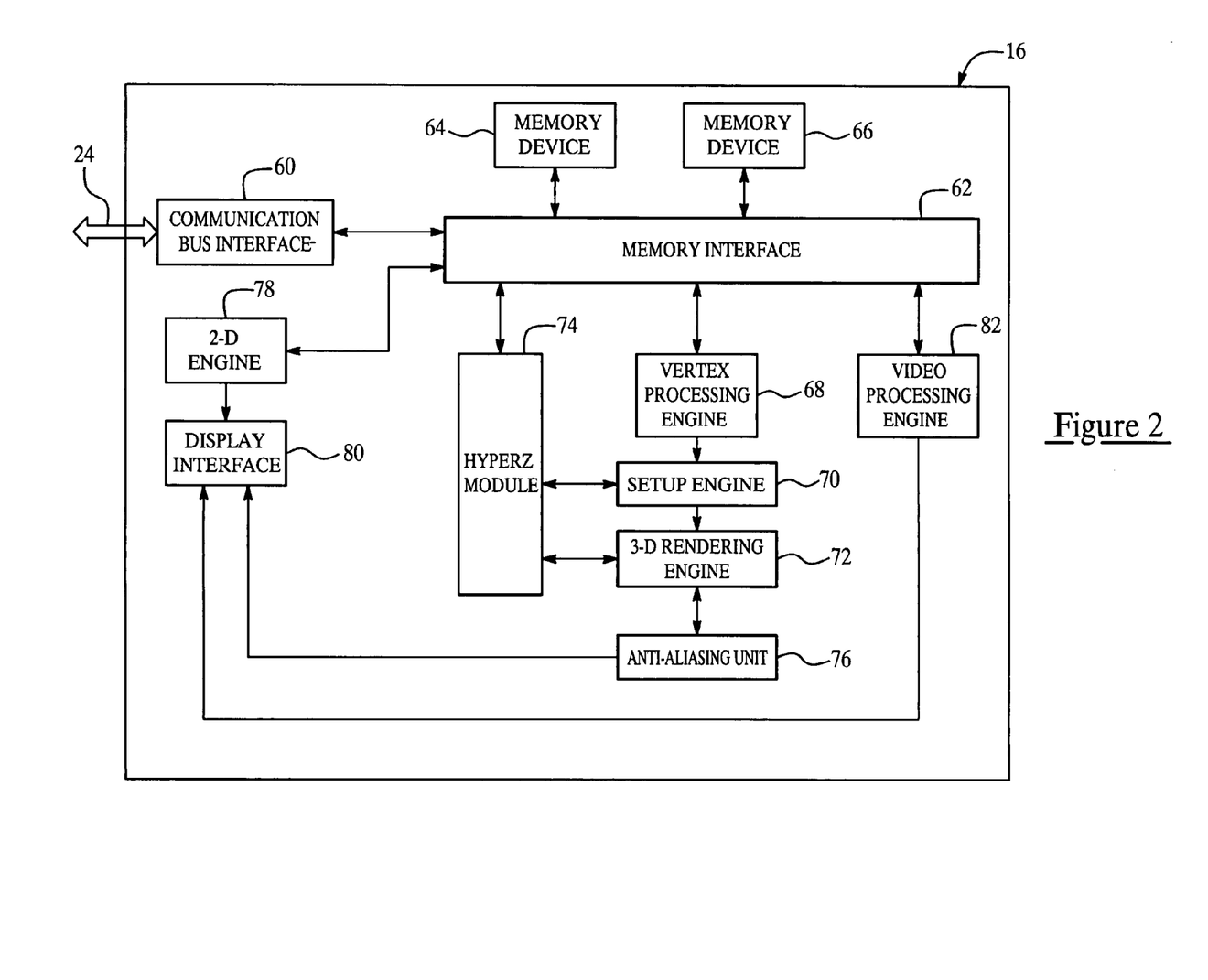
FIG. 2 is a block diagram of the graphics processing unit utilized in the system of FIG. 1.

Referring to FIG. 2, in one embodiment, the GPU 16 comprises a video graphics card that includes a communication bus 60, a memory interface 62, memory devices 64, 66, a vertex processing engine 68, a setup engine 70, a 3-D rendering engine 72, a hyperz module 74, an anti-aliasing unit 76, a 2-D engine 78, a display interface 80, and a video processing engine 82. The communication bus interface 60 operably communicates with the communication bus 24 and the memory interface 62. The memory interface 62 operably communicates with the memory devices 64, 66, the hyperz module 74, the vertex processing engine 68, and the video processing engine 82. The setup engine 70 operably communicates with a vertex processing engine 68, the hyperz module 74, and the 3-D rendering engine 72. The 3-D rendering engine 72 operably communicates with the setup engine 70, the hyperz module 74, and the anti-aliasing unit 76. Both a video processing engine 82 and the anti-aliasing unit 76 operably communicate with a display interface 80. The 2-D engine 78 operably communicates with the memory interface 62 and the display interface 80.

During operation of the GPU 16, the communication bus interface 60 receives the 3-D image data from the communication bus 24. Thereafter, the 3-D image data is transferred to the memory interface 62 that transfers the 3-D image data to the vertex processing engine 68. The vertex processing engine 68 in conjunction with the setup engine 70 and the 3-D rendering engine 72 generate the plurality of 2-D data fields based on the received 3-D image data. The hyperz module 74 formats the 2-D data fields for transport through the communication bus 24. Thereafter, the 2-D data fields are transferred through the memory interface 62 to the communication bus interface 60. Thereafter, the communication bus interface 60 transfers the 2-D data fields through the communication bus 24 to the bridge device 36.

Referring to FIG. 1, the bridge device 36 is provided to transfer a plurality of 2-D data fields from the communication bus 24 to the communication bus 26.

Figure 6:
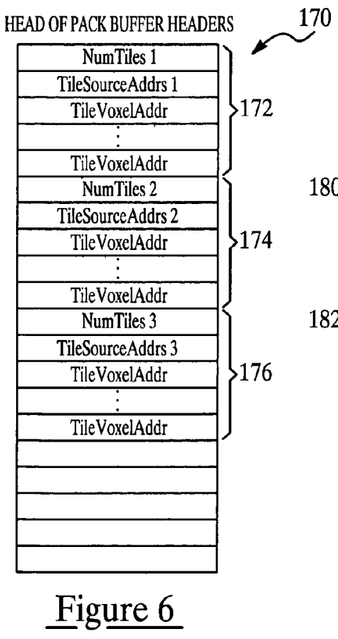
FIG. 6 is a block diagram of a plurality of pack buffer headers generated by the CPU utilized in the system of FIG. 1.

The CPU 18 is provided to receive the plurality of 2-D data fields from the communication bus 26 and to store the plurality of 2-D data fields in the memory device 19. Further, the CPU 18 is provided to generate a plurality of pack buffer headers that indicate a location where tiles or tile fragments are to be stored in a memory device 21 operably coupled to the voxel data manager 20. Referring to FIG. 5, an exemplary pack buffer header 162 generated by the CPU 18 is illustrated. The pack buffer header 162 includes the following fields of information: (i) NumTiles, (ii) TileSourceAddrs, (iii) TileVoxelAddr0, (iv) TileVoxelAddr1, and (v) TileVoxelAddr2. The NumTiles field indicates a number of tiles whose routing information is stored within the pack buffer header 162. The TileSourceAddrs field indicates a starting address in the memory device 19 for a sequence of adjacent tiles stored within the memory device 19. The TileVoxelAddr0 field indicates a destination address in the memory device 21 for the Tile0. The TileVoxelAddr1 field indicates a destination address in the memory device 21 for the Tile1. The TileVoxelAddr2 field indicates a destination address in the memory device 21 for the Tile2. Referring to FIG. 6, a plurality of pack buffer headers 170 that are generated by the CPU 18 is illustrated. The plurality of pack buffer headers 170 includes a pack buffer header 172, a pack buffer header 174, and a pack buffer header 176.

Referring to FIG. 1, the bridge device 38 is provided to transfer a plurality of 2-D data fields and pack buffer headers from the communication bus 30 to the communication bus 32. Thereafter, the communication bus 32 routes the plurality of 2-D data fields and pack buffer headers to the CPU 18.

Figure 3:
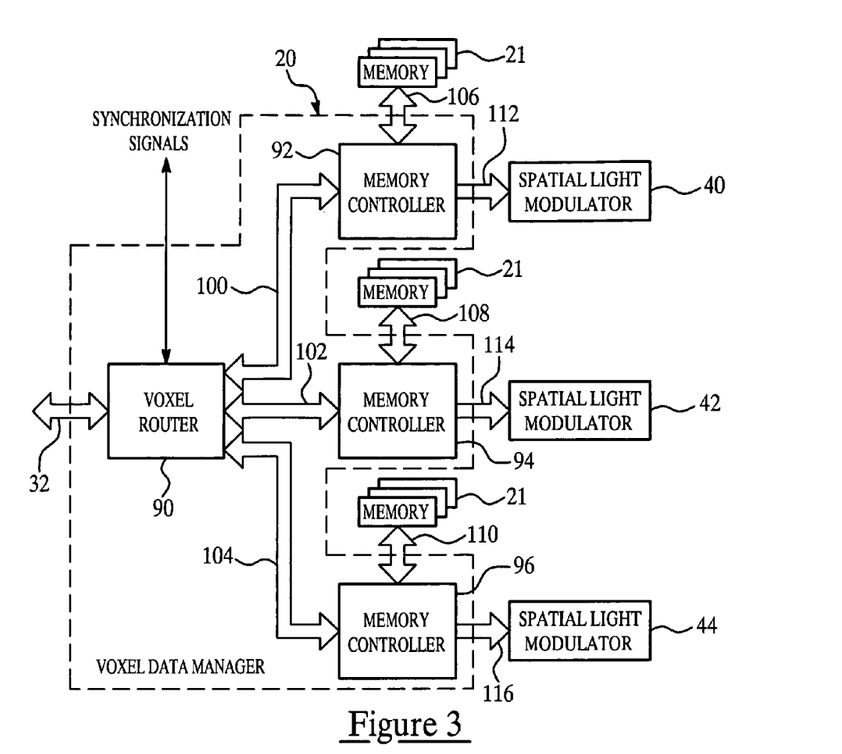
FIG. 3 is a block diagram of the voxel data manager utilized in the system of FIG. 1.

Referring to FIG. 3, the voxel data manager 20 is provided to store a plurality of 2-D data fields, each comprising a plurality of 2-D tiles, in the memory device 21 at physical locations specified by the pack buffer headers. Further, the voxel data manager 20 is provided to transfer data associated with the 2-D tiles to the spatial light modulators 40, 42, 44. The voxel data manager 20 includes a voxel router 90, memory controllers 92, 94, 96, and communication busses 100, 102, 104, 106, 108, 110, 112, 114, 116.

Figure 4:
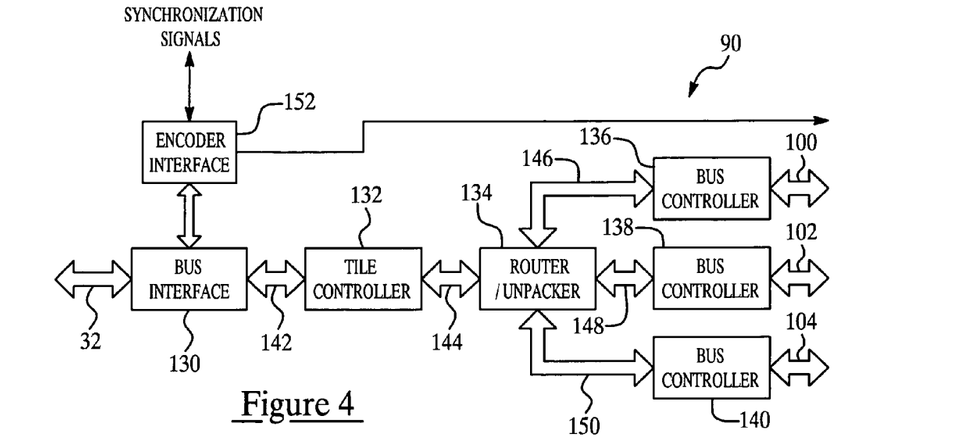
FIG. 4 is a block diagram of a voxel router utilized in the voxel data manager of FIG. 3.

Referring to FIG. 4, the voxel router 90 includes a bus interface 130, a tile controller 132, a router/unpacker module 134, bus controllers 136, 138, 140, communication busses 142, 144, 146, 148, 150, and an encoder interface 152.

The bus interface 130 is configured to receive the 2-D data fields from the CPU 18 and to transfer the 2-D data fields to the tile controller 132 via communication bus 142.

The tile controller 132 is provided to sort the 2-D data fields into 2-D tile fragments, tag each tile fragment with a decoded destination address, and transfer the tile fragments to the router/unpacker module 134 via the communication bus 144.

Figure 8:
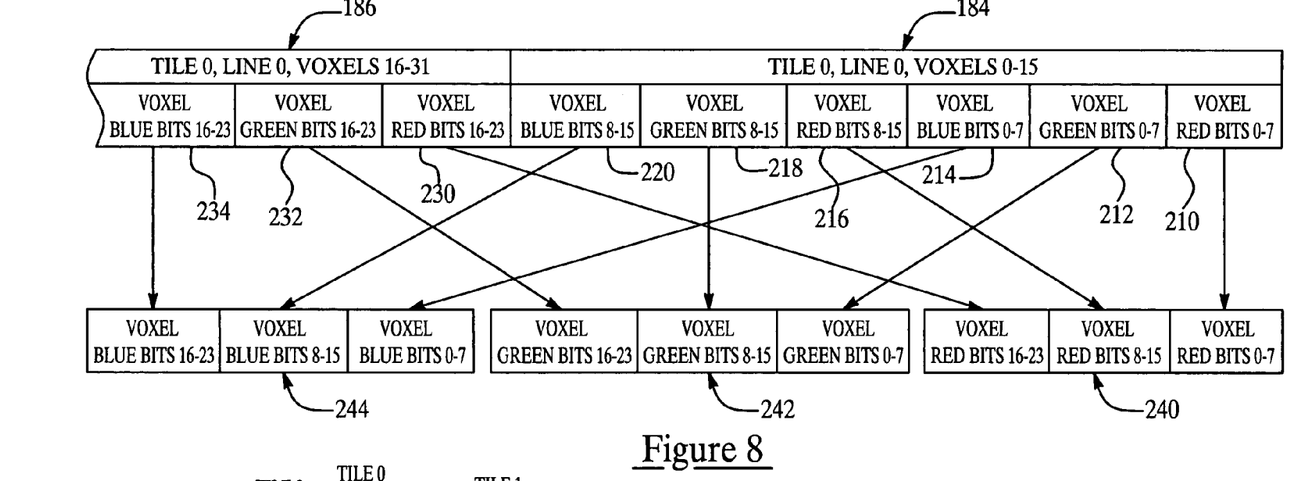
FIG. 8 is a block diagram of data words generated by a router/unpacker module utilized in the voxel router of FIG. 4.

Referring to FIG. 8, the router/unpacker module 134 is configured to generate data word segments associated with voxels from a plurality of 2-D tile fragments. For example, the router/unpacker module 134 receives the 2-D tile fragments 184, 186 having the data word segments 210, 212, 214, 216, 218, 220, and 230, 232, 234, respectively and generates the voxel data words 240, 242, 244 based on the 2-D tile fragments 184, 186. A brief explanation of an exemplary data word segment will now be provided for purposes of clarity. The data word segment 210 corresponds to voxel red bits 0-7. The voxel red bits 0-7 correspond to binary values associated with voxels 0-7, respectively, on line 0 of the Tile0. The module 134 generates the voxel data word 240 having voxel red bits from the data word segments 210, 216, 230. Further, the module 134 generates the voxel data word 242 having voxel green bits from the data word segments 212, 218, 232. Further, the module 134 generates the voxel data word 244 having voxel blue bits from the data word segments 214, 220, 234. The router/unpacker module 134 is further configured to transfer the generated voxel data words to the bus controllers 136, 138, 140. For example, the module 134 is configured to transfer the voxel data word 240 having voxel red bits to the bus controller 100 via the communication bus 146. Further, the module 134 is configured to transfer the voxel data word 242 having voxel green bits to the bus controller 138 via the communication bus 148. Further, the module are 34 is configured to transfer the voxel data word 244 having voxel blue bits to the bus controller 140 via the communication bus 150.

The bus controllers 136, 138, 140 are provided to transfer voxel data words received from the bus controllers 136, 138, 140, respectively to the memory controllers 92, 94, 96, via the busses 100, 102, 104, respectively.

The encoder interface 152 is provided to receive synchronization signals from the 3-D opto-mechanical display device 46 and to provide a synchronization signal to the memory controllers 92, 94, 96 for controlling a rate that data is retrieved from the memory 21.

The memory controllers 92, 94, 96 are provided to store voxel data words received from the voxel router 90 at physical locations in the memory 21 specified by the pack buffer headers. Further, the memory controllers 92, 94, 96 are provided to retrieve the voxel data words stored in the memory 21 and to route the voxel data words to the spatial light modulators 40, 42, 44. In particular, the memory controller 92 transfers voxel data words having voxel red bits to the spatial light modulator 40. Further, the memory controller 94 transfers voxel data words having voxel green bits to the spatial light modulator 42. Further, the memory controller 96 transfers voxel data words having voxel blue bits to the spatial light modulator 44.

Referring to FIGS. 1 and 3, the spatial light modulators 40, 42, 44 are provided to emit light in response to voxel data words received from the memory controllers 92, 94, 96, respectively. The light is received by the 3-D optomechanical device 86 to generate a 3-D image. In alternate embodiments of the system 10, other types of optoelectronic devices could be utilized instead of the spatial light modulators. For example, optoelectronic devices described in U.S. Pat. Nos. 6,544,430, 4,983,031, and 5,172,266 that are incorporated herein by reference, could be utilized instead of spatial light modulators.

The 3-D optomechanical device 46 is provided to display images thereon. In one embodiment, the device 46 comprises a multi-planar volumetric display device. For example, the device 46 comprises the multi-planar volumetric display device taught in U.S. Pat. No. 6,554,430 that is incorporated herein by reference. In another embodiment, the device 46 can comprise a holographic display device. For example, the device 46 can comprise the holographic display device taught in U.S. Pat. No. 5,172,251 that is incorporated herein by reference. In another embodiment, the device 46 comprises a multi-view or panoramagram display device. For example, the device 46 can comprise the multi-view or panoramagram display device taught in U.S. Pat. No. 4,829,365 that is incorporated herein by reference.

Figure 10:
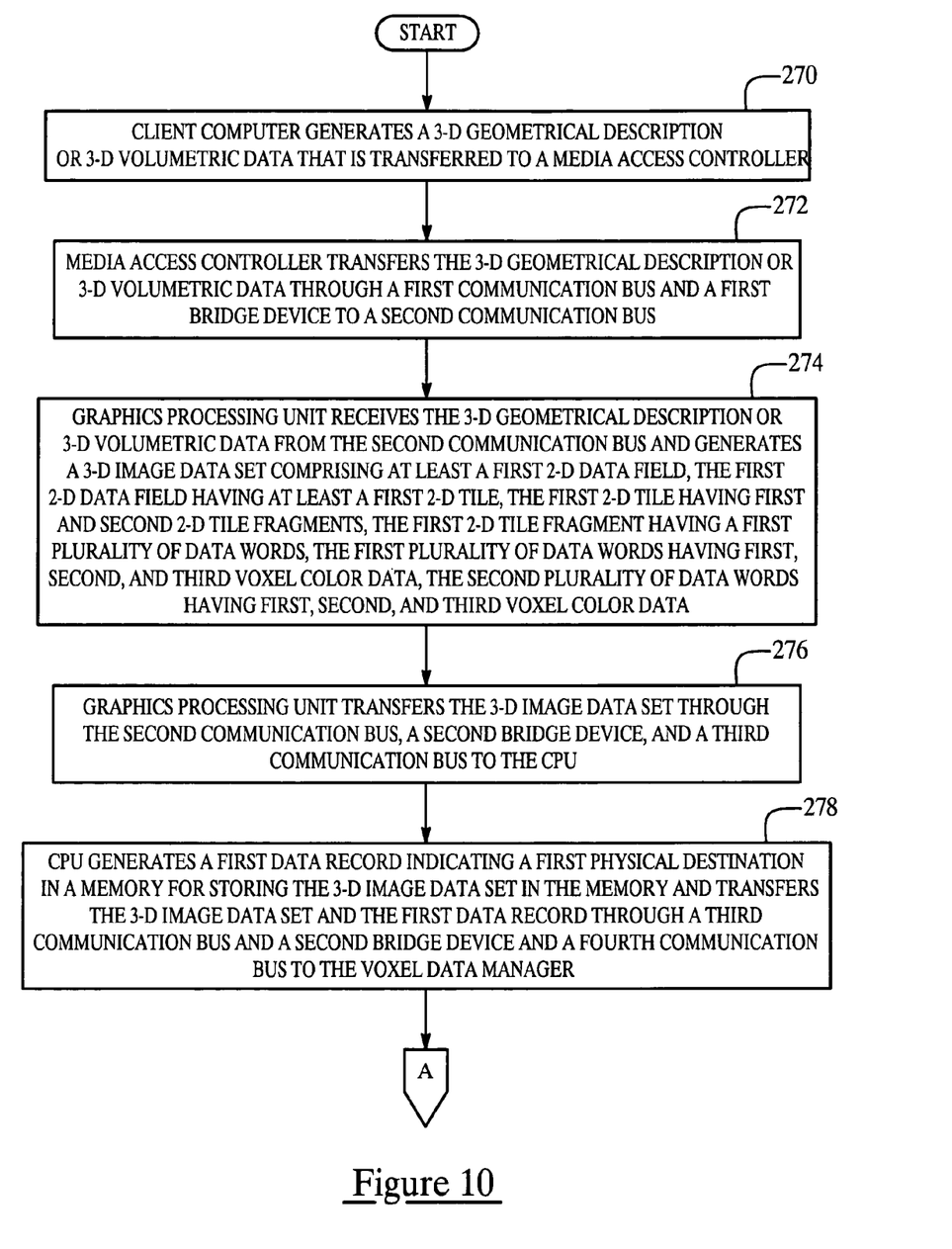
FIGS. 10-12 are flowcharts of a method for rendering data associated with a 3-D image.
Figure 11:
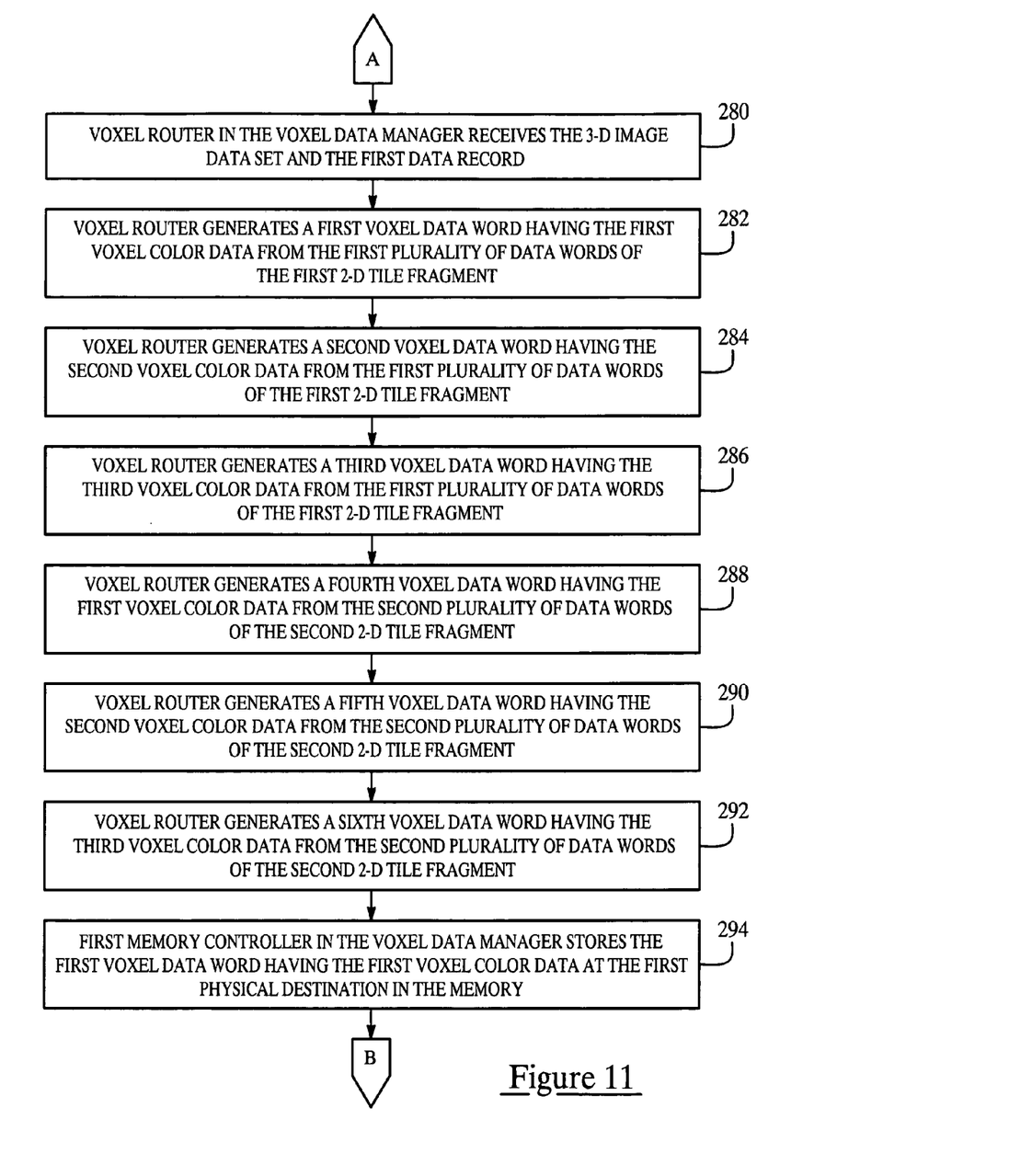
Figure 12:
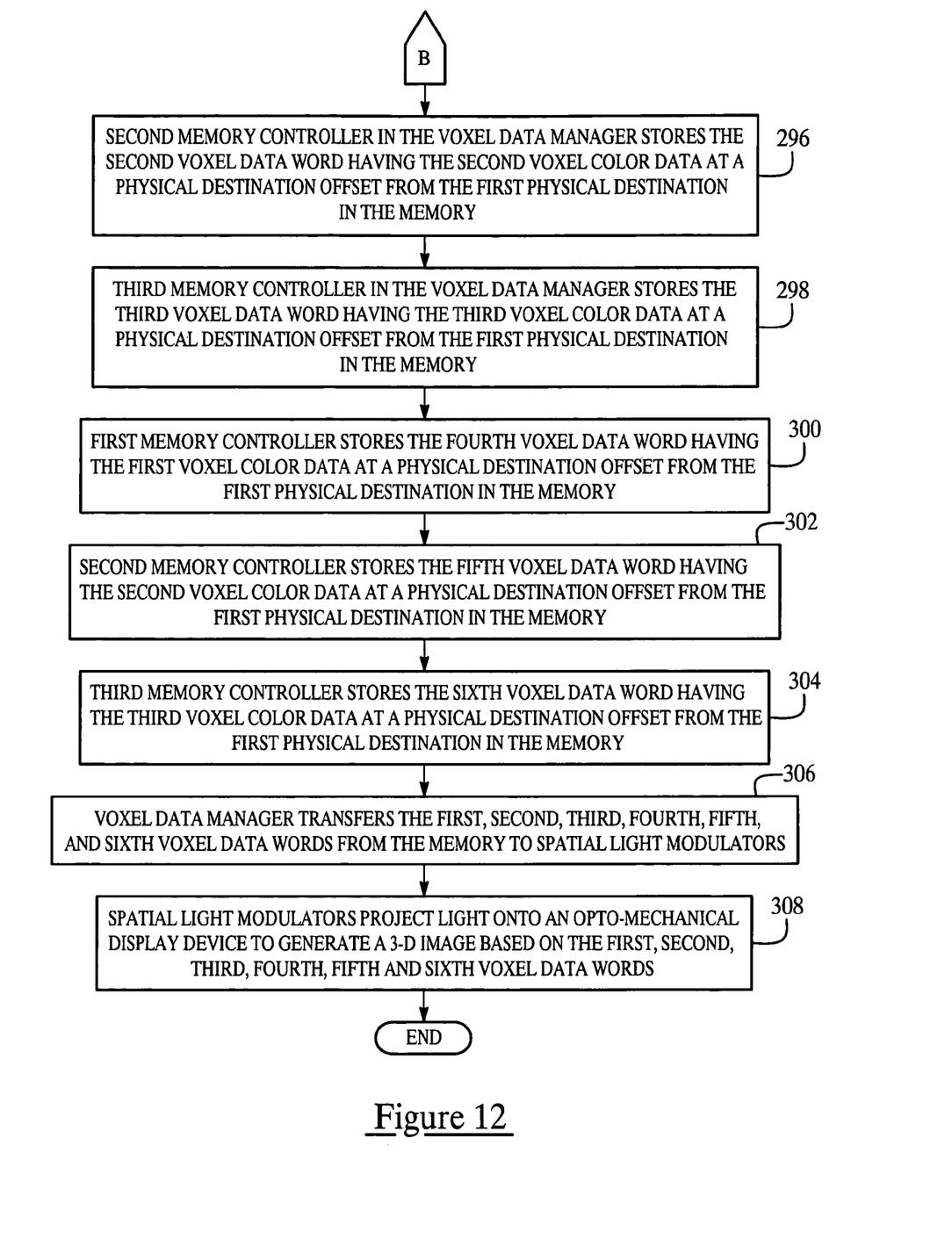

Referring to FIGS. 10-12, a method for rendering data associated with a 3-D image will now be explained. The method can be implemented utilizing software algorithms executed in the system 10.

At step 270, the client computer 12 generates a 3-D geometrical description or 3-D volumetric data that is transferred to a media access controller 14.

Next at step 272, the media access controller 14 transfers the 3-D geometrical description or 3-D volumetric data through the communication bus 22 and the bridge device 36 to the communication bus 24.

Next at step 274, the graphics processing unit 16 receives the 3-D geometrical description or 3-D volumetric data from the communication bus 24 and generates a 3-D image data set comprising at least a first 2-D data field. The first 2-D data field has at least a first 2-D tile. The first 2-D tile has first and second 2-D tile fragments. The first 2-D tile fragment has a first plurality of data words. The first plurality of data words has first, second, and third voxel color data. The second 2-D tile fragment has a second plurality of data words. The second plurality of data words has first, second, and third voxel color data.

Next at step 276, the graphics processing unit 16 transfers the 3-D image data set through the communication bus 24, the bridge device 36, and the communication bus 26 to the CPU 18.

Next at step 278, the CPU 18 generates a first data record indicating a first physical destination in a memory 21 for storing the 3-D image data set in the memory 21 and transfers the 3-D image data set and the first data record through the communication bus 30, the bridge device 38, and the communication bus 32 to the voxel data manager 20.

Next at step 280, the voxel router 90 in the voxel data manager 20 receives the 3-D image data set and the first data record. In one embodiment, the first data record comprises at least one pack buffer header.

Next at step 282, the voxel router 90 generates a first voxel data word having the first voxel color data from the first plurality of data words of the first 2-D tile fragment.

Next at step 284, the voxel router 90 generates a second voxel data word having the second voxel color data from the first plurality of data words of the first 2-D tile fragment.

Next at step 286, the voxel router 90 generates a third voxel data word having the third voxel color data from the first plurality of data words of the first 2-D tile fragment.

Next at step 288, the voxel router 90 generates a fourth voxel data word having the first voxel color data from the second plurality of data words of the second 2-D tile fragment.

Next at step 290, the voxel router 90 generates a fifth voxel data word having the second voxel color data from the second plurality of data words of the second 2-D tile fragment.

Next at step 292, the voxel router 90 generates a sixth voxel data word having the third voxel color data from the second plurality of data words of the second 2-D tile fragment.

Next at step 294, the memory controller 92 in the voxel data manager 20 stores the first voxel data word having the first voxel color data at the first physical destination in the memory 21.

Next at step 296, the memory controller 94 in the voxel data manager 20 stores the second voxel data word having the second voxel color data at a physical destination offset from the first physical destination in the memory 21.

Next at step 298, the memory controller 96 in the voxel data manager 20 stores the third voxel data word having the third voxel color data at a physical destination offset from the first physical destination in the memory 21.

Next at step 300, the memory controller 92 stores the fourth voxel data word having the first voxel color data at a physical destination offset from the first physical destination in the memory 21.

Next at step 302, the memory controller 92 stores the fifth voxel data word having the second voxel color data at a physical destination offset from the first physical destination in the memory 21.

Next at step 304, the memory controller 96 stores the sixth voxel data word having the third voxel color data at a physical destination offset from the first physical destination in the memory 21.

Next at step 306, the voxel data manager 20 transfers the first, second, third, fourth, fifth, and sixth voxel data words from the memory 21 to spatial light modulators 40, 42, 44, respectively.

Next at step 308, the spatial light modulators 40, 42, 44 project light onto an optomechanical display device 46 to generate a 3-D image based on the first, second, third, fourth, fifth, and sixth voxel data words. After step 308, the method is exited.

Figure 13:
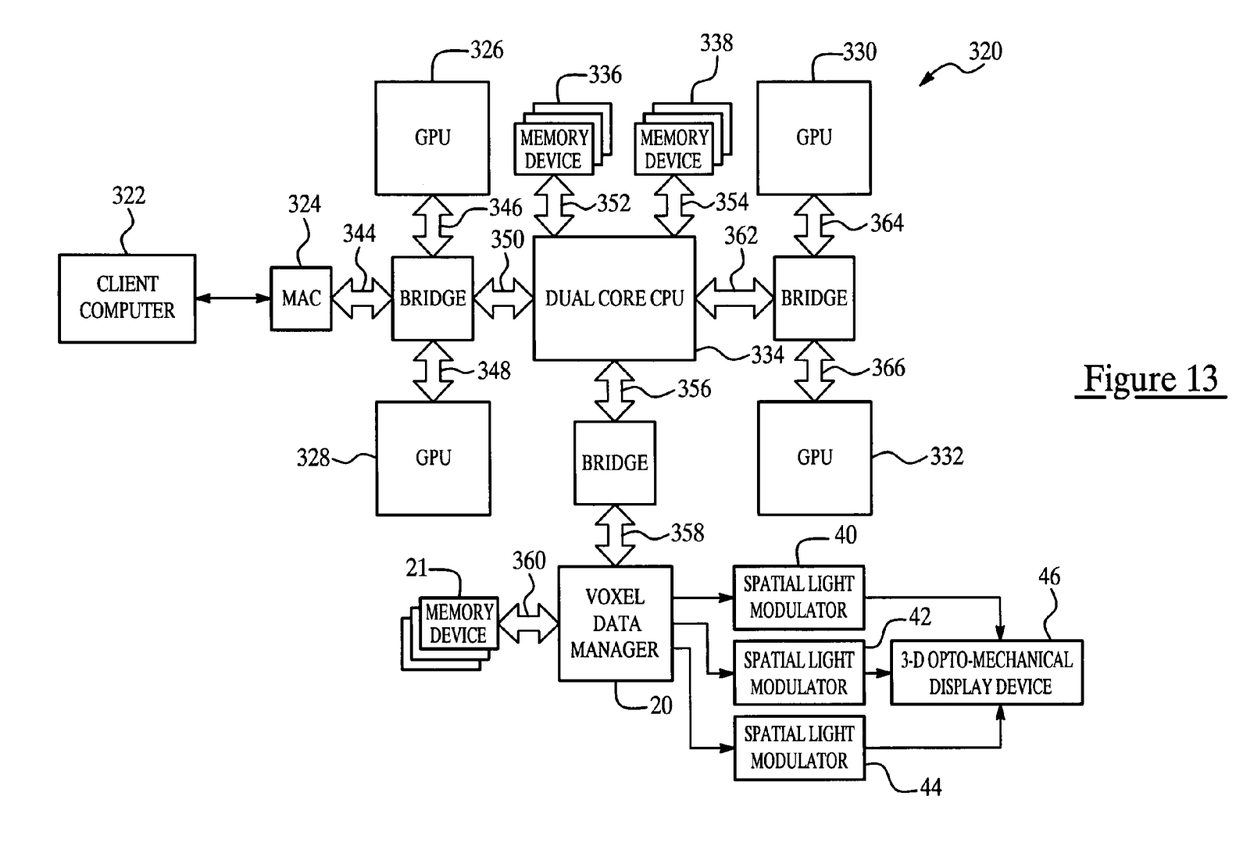
FIG. 13 is a schematic of a system for rendering data associated with a 3-D image including a graphics processing unit and a voxel data manager in accordance with another exemplary embodiment.

Referring to FIG. 13, a system 320 for rendering data associated with 3-D image in accordance with another exemplary embodiment is illustrated. The system 320 includes a client computer 322, a media access controller 324, graphic processing units 326, 328, 330, 332, a dual core CPU 334, memory devices 336, 338, a voxel data manager 20, the memory device 21, communication buses 344, 346, 348, 350, 352, 354, 356, 358, 360, 362, 364, 366, spatial light modulators 40, 42, 44, and a 3-D optomechanical display device 46. The primary difference between the system 320 and the system 10 is that the system 320 utilizes four graphics processing units (e.g., graphics processing units 326, 328, 330, 332) to perform rendering calculations, instead of one graphics processing unit. In particular, the rendering computations associated with 3-D image data can be distributed among the graphics processing units 326, 328, 330, 332 and the resulting 2-D data fields can be streamed to the voxel data manager 20. Thereafter, the voxel data manager 20 can store the data associated with a 2-D data fields in the memory device 21, in a similar manner as discussed above with system 10.

The system and method for rendering data associated with one or more 3-D images provide a substantial advantage over other systems and methods. In particular, the system utilizes a graphics processing unit that receives 3-D image data from a communication bus and calculates 2-D data fields based on the 3-D image data. Thereafter, the GPU transmits the 2-D data fields through the same communication bus to a voxel engine. As a result, a relatively large number of voxels can be rendered each second on a 3-D display device.

As described above, the present embodiments can be embodied in part in the form of computer-implemented processes and apparatuses for practicing those processes. The present embodiments can also be embodied in the form of computer program code containing instructions embodied in tangible media, such as floppy diskettes, CD ROMs, hard drives, or any other computer-readable storage medium.

While embodiments of the invention are described with reference to the exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another. Furthermore, the use of the terms a, an, etc. do not denote a limitation of quantity, but rather denote the presence of at least one of the referenced items.

What is claimed is:

1. A system for rendering data associated with a 3-D scene description, comprising:
   a graphics processing unit configured to operably communicate with a communications bus, the graphics processing unit further configured to receive the 3-D scene description from the communications bus and to generate a 3-D image data set comprising at least a first 2-D data field based on the 3-D scene description, the 3-D scene description having 3-D geometrical data or 3-D volumetric data, the graphics processing unit further configured to transmit the 3-D image data set through the communication bus; and
   a voxel data manager operably communicating with the graphics processing unit, the voxel data manager having a voxel router and at least a first memory controller operably communicating with the voxel router, the voxel router configured to receive the 3-D image data set, the first memory controller further configured to transfer the 3-D image data set to at least a first physical destination in the memory, the first 2-D data field having at least a first 2-D tile, and the first 2-D tile having at least first and second 2-D tile fragments.

2. The system of claim 1, wherein the first memory controller is further configured to transfer the 3-D image data set from the memory to at least one 3-D image generating optoelectronic device.

3. The system of claim 1, wherein the first 2-D tile fragment has a first plurality of data words, the first plurality of data words having first, second, and third voxel color data.

4. The system of claim 3, wherein the voxel router is further configured to generate a first voxel data word having the first voxel color data from the first plurality of data words, the first memory controller configured to store the first voxel data word at the first physical destination in the memory.

5. The system of claim 4, wherein the voxel data manager further comprises a second memory controller operably communicating with the voxel router, the voxel router further configured to generate a second voxel data word having the second voxel color data from the first plurality of data words, the second memory controller configured to store the second voxel data word at a physical destination offset from the first physical destination in the memory.

6. The system of claim 5, wherein the voxel data manager further comprises a third memory controller operably communicating with the voxel router, the voxel router further configured to generate a third voxel data word having the third voxel color data from the first plurality of data words, the third memory controller configured to store the third voxel data word at a physical destination offset from the first physical destination.

7. A method for rendering data associated with a 3-D scene description utilizing a graphics processing unit and a voxel data manager, the graphics processing unit operably communicating with the voxel data manager, the voxel data manager having a voxel router and first, second, and third memory controllers, the method comprising:
   receiving the 3-D scene description from a communications bus at the graphics processing unit;
   generating a 3-D image data set comprising at least a first 2-D data field based on the 3-D scene description, utilizing the graphics processing unit;
   transmitting the 3-D image data set from the graphics processing unit through the communication bus;
   receiving the 3-D image data set from the graphics processing unit at the voxel router; and
   transferring the 3-D image data set to at least a first physical destination in the memory utilizing the first memory controller, the first 2-D data file having at least a first 2-D tile, and the first 2-D tile having at least first and second 2-D tile fragments.

8. The method of claim 7, wherein the 3-D scene description comprises 3-D geometrical data or 3-D volumetric data.

9. The method of claim 7, further comprising transferring the 3-D image data set from the memory to at least one 3-D image generating optoelectronic device utilizing the voxel data manager.

10. The method of claim 7, wherein the first 2-D tile fragment has a first plurality of data words, the first plurality of data words having first, second, and third voxel color data.

11. The method of claim 10, further comprising
generating a first voxel data word having the first voxel color data from the first plurality of data words, utilizing the voxel router; and
storing the first voxel data word at the first physical destination utilizing the first memory controller.

* * * * *